May 24, 1938.  E. W. ROBERTS  2,118,232
GAS COCK
Filed July 20, 1936
FIG.I.
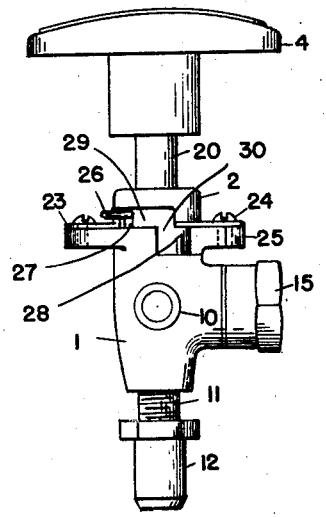
FIG.2.
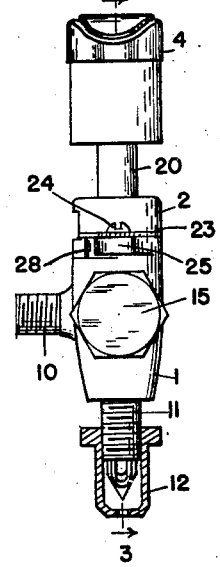
FIG.3.
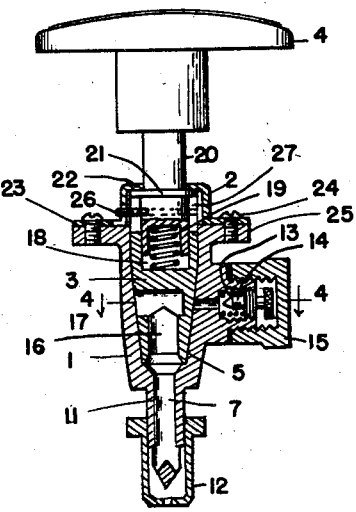
FIG.4.
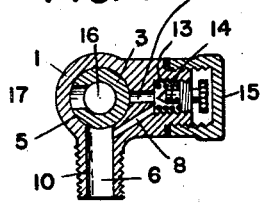
FIG.9.
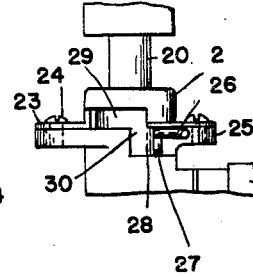
FIG.5.
FIG.5A.
FIG.6.
FIG.6.A.
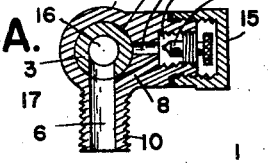
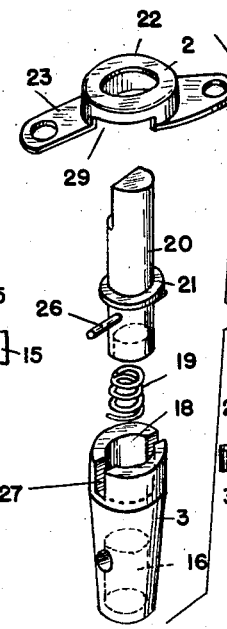
FIG.8.
FIG.7.
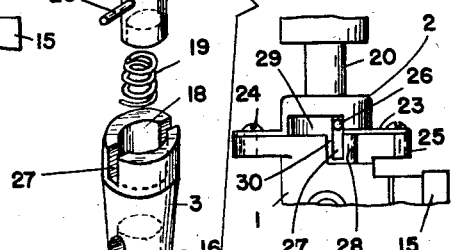
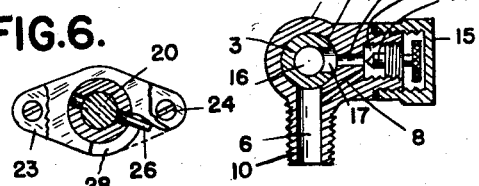
INVENTOR
EARL W. ROBERTS
BY
ATTORNEYS Patented May 24, 1938

2,118,232

UNITED STATES PATENT OFFICE 2,118,232

GAS COCK

Earl W. Roberts, Detroit, Mich., assignor to The Roberts Brass Manufacturing Company, Detroit, Mich., a corporation of Michigan Application July 20, 1936, Serial No. 91,602

9 Claims. (Cl. 251—154)

This invention relates generally to gas cocks of the rotary plug type having at least one main passage and one restricted or smaller passage for alternately conducting gas to one or more outlets for supplying high and low flames respectively, and refers more particularly to an improved means for regulating or stopping the movement of the rotary plug that controls the flow of gas through said passages.

One of the essential objects of the invention is to provide a gas cock of this type wherein a single stop element such as a pin or its equivalent carried by the operating stem for the rotary plug is engageable with a slot in the plug casing when it is desired to open and close the restricted passage and is engageable with a slot in a cap for said casing when it is desired to open and close the main passage.

Another object is to provide a gas cock wherein the slots aforesaid are arranged in connecting stepped relation with the connection therebetween at the proper point to receive the stop element when the main passage is fully opened. As a result the main passage will remain open during and unaffected by movement of said stop element from one stop to the other.

Another object is to provide a gas cock wherein the operating stem is slidably but non-rotatably connected to the rotary plug by engagement of the stop element with a slot in the plug, and is urged outwardly by a suitable spring in the plug. Hence the stem must be positively moved in by hand against the tension of said spring when the stop element is in registration with the connection aforesaid between the slots to permit such pin to enter the slot in the casing when it is desired to turn on the gas to the restricted passage, and will be moved out by the spring when the stop element is returned to registration with the connection between the slots, whereby said stop element will be moved into the slot in the cap where it is free to move should it be desired to turn the plug to fully closed position.

Another object is to provide a gas cock that is relatively simple in construction and can be manufactured at a comparatively low cost.

Other objects, advantages and novel details of construction of this invention will be made more apparent as this description proceeds, especially when considered in connection with the accompanying drawing, wherein:

Figure 1 is a side elevation of a gas cock embodying my invention and showing the rotary plug in fully closed position;

Figure 2 is a view similar to Figure 1, but taken at substantially right angles thereto;

Figure 3 is a sectional view taken substantially on the line 3—3 of Figure 2;

Figure 4 is a sectional view taken on the line 4—4 of Figure 3;

Figures 5 and 5A respectively are diagrammatic views in section showing the position of the parts when the transverse passage in the plug is in registration with the inlet passage in the casing;

Figures 6 and 6A respectively are views similar to Figures 5 and 5A, but showing the parts when the transverse passage in the plug is in registration with one of the restricted passages in the casing;

Figure 7 is a group perspective view of the parts of my gas cock except the casing and handle;

Figure 8 is a fragmentary side elevation of the gas cock with the rotary plug in fully opened position;

Figure 9 is a view similar to Figure 8, but showing the rotary plug in the simmering position.

Referring to the drawing, 1 is the casing, 2 is a substantially cup-shaped cap for one end of said casing, 3 is the rotary plug, and 4 is the operating handle of a gas cock embodying my invention. As shown, the casing 1 is a casting and has a longitudinally extending tapered socket 5 for the rotary plug 3, main inlet and outlet passages 6 and 7, and restricted passages 8 and 9 for gas. Preferably the inlet passage 6 extends transversely of the casing from the outer end of an exteriorly threaded laterally projecting nipple 10 to the socket 5, while the outlet passage 7 extends longitudinally of the casing from the bottom of said socket 5 to a longitudinally extending exteriorly threaded nipple 11. The usual apertured cap 12 is preferably mounted on said nipple 11.

The restricted passages 8 and 9 cooperate with a laterally projecting socket 13 at one side of the casing to form a by-pass for gas from the inlet passage 6 to the socket 5. Preferably the restricted passage 8 extends between the inlet passage 6 and socket 13, while the passage 9 extends from the socket 13 to the socket 5. 14 is a needle valve adjustable in the socket 13 for controlling the flow of gas from the passage 8 to the passage 9, and 15 is a cap for the top end of said socket 13.

The rotary plug 3 is provided in its inner end with a longitudinally extending passage 16 that is in constant registration with the outlet passage 7 in the casing and is provided at the closed end of said longitudinal passage 16 with a transversely extending passage 17 that is adapted upon rotation of the plug to communicate with and receive gas from the inlet passage 6 and the restricted passage 9 in the casing. At its outer end the plug 3 is provided with a socket 18 for the reception of a coil spring 19 and the stem 20 of the operating handle. Preferably the spring 19 is between the bottom of the socket 18 and the inner end of said stem and constantly urges the latter outwardly, while the stem 20 has an integral annular flange 21 engageable with the top 22 of the cup-shaped cap to limit such outward movement. In this connection it will be noted that the cap 2 is provided at substantially diametrically opposite sides thereof with flanges 23 that are fastened by screws 24 to suitable flanges 25 of the casing.

In the present instance the stem 20 of the handle carries a transversely extending pin 26 that slidably engages longitudinally extending slots 27 at diametrically opposite sides of the socket 18 in the outer end of the rotary plug and is alternately engageable with circumferentially extending slots 28 and 29 respectively in the casing 1 and cap 2. As shown, the slots 28 and 29 are arranged in stepped relation with a connecting slot 30 at the proper point to receive the pin 26 when the passages 6 and 17 are in registration. Preferably the arrangement is such that the pin 26 is movable in the slot 29 in the cap when it is desired to open and close the inlet passage 6 and is movable in the slot 28 in the casing when it is desired to open and close the restricted passage 9. Inasmuch as the spring 19 is between the bottom of the socket 18 in the plug and the inner end of the stem 20, it is apparent that the stem has to be pushed in against said spring when the pin 26 is in line with the connecting slot 30 to cause said pin to move from the slot 29 to the slot 28, and that the said spring will move the stem 20 outwardly when the pin 26 is in line with the connecting slot 30 to cause said pin to be moved from the slot 28 to the slot 29. Furthermore, the arrangement is such that the movement of the pin 26 in either direction in the connecting slot 30 may be effected while the passages 6 and 17 are in registration.

What I claim as my invention is:

1. A gas cock having a casing provided with a main passage and a restricted passage for gas, a rotary plug in the casing having a passage adapted upon rotation of the plug to communicate alternately with said main passage and restricted passage, a cap for the plug mounted on said casing, said casing and cap having connecting slots therein, and means controlling the rotary movement of the plug including an operating member for the plug, and means carried by said operating member engageable with the slot in said casing when it is desired to open and close one of the passages aforesaid and engageable with the slot in the cap when it is desired to open and close the other passage.

2. A gas cock having a casing provided with a main passage and a restricted passage for gas, a rotary plug in the casing having a passage adapted upon rotation of the plug to communicate alternately with said main passage and restricted passage, a cap for the plug mounted on the casing, said casing and cap having circumferentially extending connecting slots arranged in stepped relation, and means controlling the rotary movement of the plug including an operating member for the plug, and a stop element carried by said operating member engageable with the slot in said casing when it is desired to open and close one of the passages aforesaid and engageable with the slot in the cap when it is desired to open and close the other passage.

3. A gas cock having a casing provided with a main passage and a restricted passage for gas, a rotary plug in the casing having a passage adapted upon rotation of the plug to communicate alternately with said main passage and restricted passage, a cap for the plug mounted on the casing, said casing and cap having connecting slots therein arranged in stepped relation, and means controlling the rotary movement of the plug including an operating member slidably but non-rotatably connected to the plug, said connection including a pin carried by said operating member operable during turning movement of the plug to move in either of said slots and operable during sliding movement of the operating member to move from one slot to the other, said pin being engageable with the slot in the casing when it is desired to open and close one of the passages aforesaid and engageable with the slot in the cap when it is desired to open and close the other passage.

4. A gas cock having a casing provided with a main passage and a restricted passage for gas, a rotary plug in the casing having a passage adapted upon rotation of the plug to communicate alternately with said main passage and restricted passage, a cap for the plug mounted on the casing, said casing and cap having circumferentially extending connecting slots, and means controlling the rotary movement of the plug including an operating member slidably but non-rotatably connected to the plug, said connection including a pin carried by said operating member and alternately engageable with the slots in said casing and cap, the arrangement of said slots being such that said pin is engageable with opposite ends of said slots during rotary movement of the said plug and is movable from one slot to the other during sliding movement of the operating member relative to said plug, said pin being engageable with the slot in the casing when it is desired to open and close the restricted passage and engageable with the slot in the cap when it is desired to open and close the main passage, the connection between the slots being at the proper point to receive the pin when the main passage is fully opened.

5. A gas cock having a cast metal casing provided with a main passage and a restricted passage for gas, a rotary plug in the casing having a passage adapted upon rotation of the plug to communicate alternately with said main passage and restricted passage, a sheet metal cap for the plug mounted on the cast metal casing, said casing and cap having offset circumferentially extending slots therein, and means controlling the rotary movement of the plug including an operating member for the plug, and a pin projecting laterally from said operating member movable lengthwise of the slot in the casing when it is desired to open and close one of the passages aforesaid and movable lengthwise of the slot in the cap when it is desired to open and close the other passage.

6. A gas cock having a casing provided with two passages for gas, a rotary plug in the casing having a passage adapted upon rotation of the plug to communicate alternately with said passages, a cap for the plug mounted on the casing, said casing and cap having offset circumferentially extending slots therein, and means controlling the rotary movement of the plug including an operating member for the plug, and a pin projecting laterally from said operating member movable lengthwise of the slot in the casing when it is desired to open and close one of the passages aforesaid and movable lengthwise of the slot in the cap when it is desired to open and close the other passage.

7. A gas cock having a casing provided with two passages, a rotary plug in the casing having a passage adapted upon rotation of the plug to communicate alternately with said passages, a cap for the plug mounted on the casing, said casing having circumferentially spaced stop means, said cap having circumferentially spaced stop means, and an operating member for said plug having stop means engageable with said stop means of said cap when it is desired to open or close one of said passages aforesaid, and engageable with said stop means of said casing when it is desired to open or close the other passage.

8. A gas cock having a casing provided with two passages for gas, a rotary plug in the casing having a passage adapted upon rotation of the plug to communicate alternately with said passages, said casing having axially spaced communicating, circumferentially extending slots, means controlling the rotary movement of said plug including an operating member for the plug, a pin projecting laterally from said operating member and extending through said slots so as to be visible, said pin being movable lengthwise of one of said slots when it is desired to open or close one of said passages aforesaid, and movable lengthwise of the other of said slots when it is desired to open or close the other passage.

9. A gas cock having a casing provided with two passages for gas, a rotary plug in the casing having a passage adapted upon rotation of the plug to communicate alternately with said passages said casing having axially spaced communicating circumferentially extending recesses, means controlling the rotary movement of said plug including an operating member for the plug, and means carried by said operating member movable lengthwise of one of said recesses when it is desired to open or close one of said passages aforesaid, and movable lengthwise of the other of said recesses when it is desired to open or close the other passage.

EARL W. ROBERTS.